(12) United States Patent
Turek

(10) Patent No.: US 6,450,320 B1
(45) Date of Patent: Sep. 17, 2002

(54) ELECTRODE ORIENTATION

(75) Inventor: Jerry G. Turek, Hudson, OH (US)

(73) Assignee: General Electric Company, Schenectady, NY (US)

(*) Notice: Subject to any disclaimer, the term of this patent is extended or adjusted under 35 U.S.C. 154(b) by 7 days.

(21) Appl. No.: 09/656,411

(22) Filed: Sep. 6, 2000

(51) Int. Cl.⁷ .............................................. B65G 47/24
(52) U.S. Cl. ...................................... 198/380; 198/391
(58) Field of Search ................................ 198/380, 391; 221/160, 161, 167, 168

(56) References Cited

U.S. PATENT DOCUMENTS

| | | | | |
|---|---|---|---|---|
| 2,891,668 A | * | 6/1959 | Hunt ............................ | 198/391 |
| 3,101,832 A | * | 8/1963 | Wyle et al. ................. | 198/391 |
| 3,147,841 A | * | 9/1964 | Austin ......................... | 198/391 |
| 5,083,654 A | * | 1/1992 | Nakajima et al. ........... | 198/380 |

* cited by examiner

Primary Examiner—Joseph E. Valenza
(74) Attorney, Agent, or Firm—Fay, Sharpe, Fagan, Minnich & McKee, LLP

(57) ABSTRACT

A vibratory feeder for transporting and orienting electrodes for a lamp. The vibratory feeder includes a vibratory bowl and a vibratory track. The vibratory track has a first end in communication with an outlet of the vibratory bowl. The vibratory track includes one or more gradually inclining wall portions for engaging shank portions of mis-oriented electrodes for re-orienting the electrodes. A supply of electrodes are supplied to the vibratory track. A leading electrode is separated from the supply of electrodes. The leading electrode is moved along the vibratory track. The shank portion of a mis-oriented leading electrode is engaged with an inclined wall portion of the vibratory track to re-orient the electrode.

19 Claims, 4 Drawing Sheets

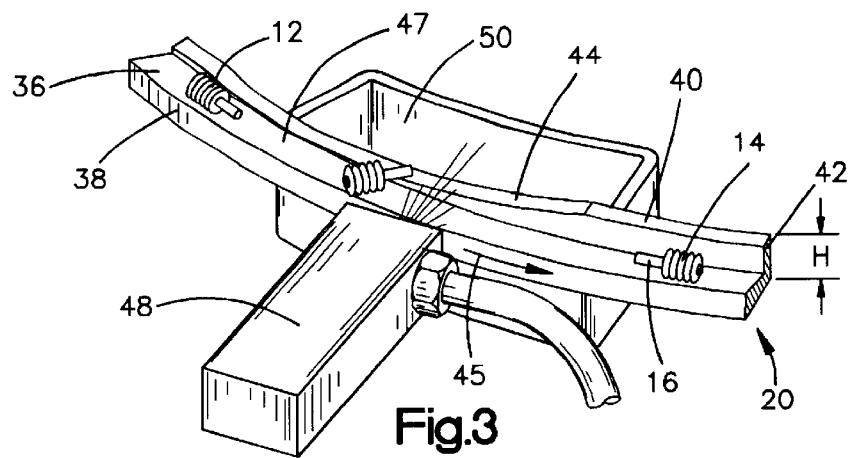
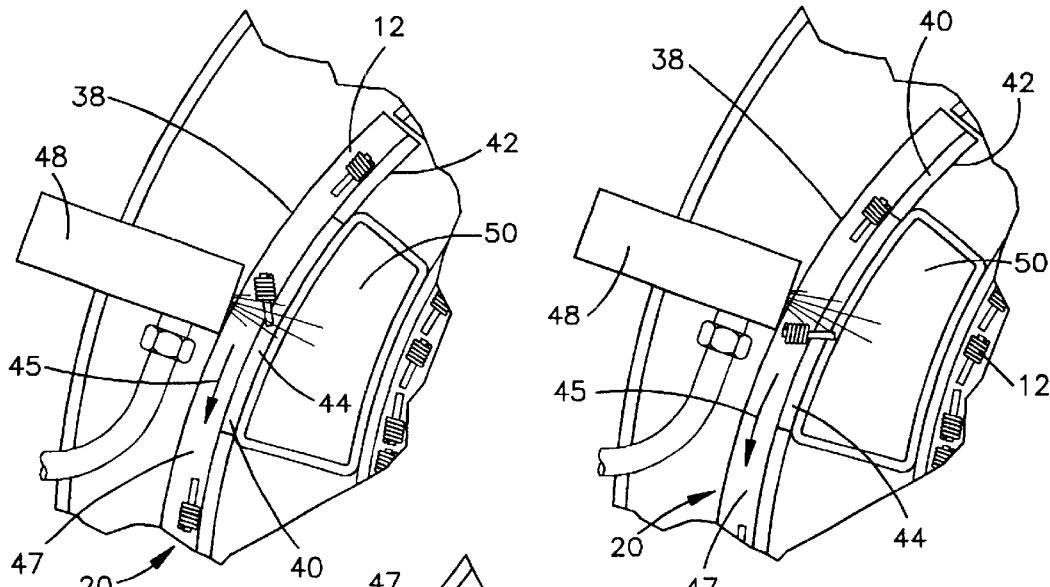
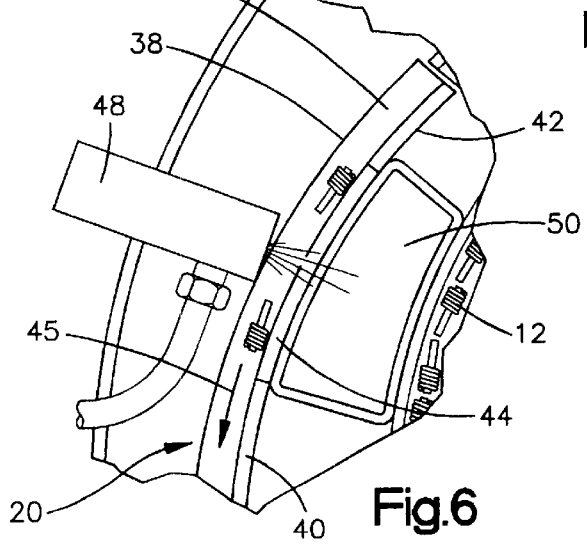

ELECTRODE ORIENTATION

TECHNICAL FIELD

The present invention relates to lamp electrode orientation and, more particularly, the present invention relates to a method and apparatus for transporting and orienting electrodes for a lamp.

BACKGROUND ART

It is common in the prior art to use vibratory feeders to transport electrodes used in lamps from a supply of electrodes to a desired location. Prior art vibratory feeders include a vibratory bowl having an internal track that extends around the inner surface of the vibratory bowl from a base of the vibratory bowl to a top of the vibratory bowl. The internal track of the vibratory bowl transports electrodes from the base of the vibratory bowl to the top of the vibratory bowl. Some prior art vibratory feeders also include an external track that extends from an end of the internal track at the top of the vibratory bowl to the location where the electrodes are to be transported.

The external track includes a horizontal or vertical slot that is sized to accept electrode shanks. The electrode shanks slide into the slot in the external track. As the external track vibrates, a coil portion of the electrode tip moves along the slotted external track with the shank portion following in the slot. Irregularities in the shank portion and the coil portion frequently cause electrodes to get jammed in the slot of the external track. Electrodes frequently get caught in the slot of the prior art feeder causing jams. Jams are also caused by debris that enters the slot, such as broken or loose electrode tips, incorrect electrodes, clumps of emission powder and other foreign material.

It is desirable to recycle electrodes that are not successfully welded during lamp assembly. Unsuccessful welding of an electrode increases the size of the electrode shank. If used in a prior art slot-type feeder, the increase in size of the shank of an unsuccessfully welded electrode would prevent the shank from entering the slot or would cause the shank to become lodged in the slot. Recycled electrodes cannot be used in prior art feeders, because the shank will not enter the slot, or will become jammed as a result of the enlarged shank will becoming "wedged" in the slot of the external track.

Prior art vibratory feeders vibrate continuously. The electrode moves continuously along the internal and external tracks to a gating system. The prior art gating system employs plungers that move up and down to allow individual electrodes to exit the external track. The plungers are timed such that a preceding plunger rises at the same time a following plunger moves downward to intercept and stop a next subsequent electrode. Since the electrodes do not always move at the same rate along the external track, the cylindrical plunger often moves down onto an electrode causing a jam of the gating system which jams the entire vibratory feeder.

DISCLOSURE OF INVENTION

The present invention concerns a method and apparatus for transporting and orienting electrodes for assembly into a lamp. The apparatus for transporting and orienting electrode tips includes a vibratory bowl having an outlet for supplying electrodes to a vibratory track. The vibratory track has a first end that is in communication with the outlet of the vibratory bowl. One or more gradually inclining wall portions are included in the vibratory track. The one or more gradually inclining wall portions are adapted to engage shank portions of misoriented electrodes to reorient the electrode tips.

The electrode transporting and orienting apparatus may also include an air jet mounted near the vibratory track for applying air pressure to a leading electrode. The application of air pressure to the leading electrode temporarily inhibits movement of the leading electrode along the track. An air jet may be mounted near the vibratory track across from one of the inclining wall portions for applying pressure to misoriented electrodes. The application of air pressure to the misoriented electrodes assists in properly reorienting misoriented electrodes.

The apparatus may include an air jet mounted near one side of the vibratory track for applying air pressure to the vibratory track. A blow off tray is mounted near a second side of the vibratory track. The application of air pressure by the air jet to the vibratory track blows debris off the vibratory track into the blow off tray. The apparatus may include an air jet mounted near a first side of a vibratory track for applying air pressure to improperly oriented electrodes. An opening in the bowl is located near the second side of the vibratory track for accepting improperly oriented electrodes. A sensor may be located near a second end of the track for sensing the presence of an electrode tip. A movable stop may be included near the second end of the track for selectively allowing electrode tips to exit the second end of the track.

To transport and orient electrodes for assembly into a lamp, a supply of electrodes is provided to the vibratory track. A leading electrode having an elongated shank portion and an enlarged coil portion is separated from the supply of electrodes. The separated leading electrode is moved along the vibratory track. The shank portion of a misoriented leading electrode is engaged by the inclined wall portion of the vibratory track to reorient the misoriented electrode. The properly oriented leading electrode is moved along the vibratory track to transport the leading electrode to its destination.

The separation of a leading electrode may be accomplished by applying fluid pressure to the leading electrode to temporarily inhibit motion of the leading electrode along the track. Fluid pressure may be applied to the coil portion of a misoriented leading electrode to assist reorientation of the leading electrode. Fluid pressure may be applied to the track to remove debris from the track. Fluid pressure may be applied to misoriented leading electrode to return the misoriented electrode to the supply of electrode. The shank portion of a misoriented electrode that is not successfully reoriented by a first inclined wall portion may be engaged by one or more subsequent inclined wall portions of the track to reorient the misoriented electrode shank portion. The shank portion of a misoriented electrode may be engaged with a substantially vertical wall to reorient the misoriented electrode.

BRIEF DESCRIPTION OF DRAWINGS

FIG. 3 is perspective view of an electrode orientation portion of a vibratory feeder;

FIG. 4 is an enlarged top plan view of an electrode orienting portion of a vibratory feeder;

FIG. 5 is an enlarged top plan view of an electrode orienting portion of a vibratory feeder;

FIG. 6 is an enlarged top plan view of an electrode orienting portion of a vibratory feeder;

BEST MODE FOR CARRYING OUT THE INVENTION

Figure 9:
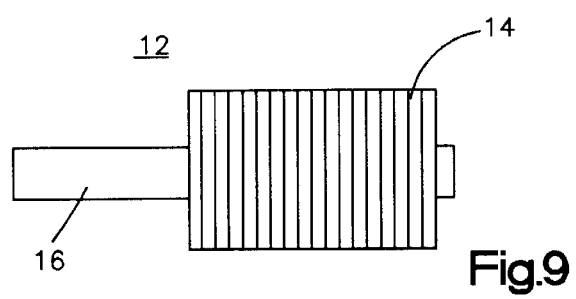

The present invention is directed to a vibratory feeder 10 for transporting and orienting electrodes 12 for lamps to a desired location. As seen in the enlarged depiction of FIG. 9, the electrodes 12 each include an enlarged coil portion 14 and a shank portion 16. The vibratory feeder 10 includes a vibratory bowl 18 and a vibratory track 20 positioned to accept electrodes 12 dispensed from the bowl 18.

Figure 1:
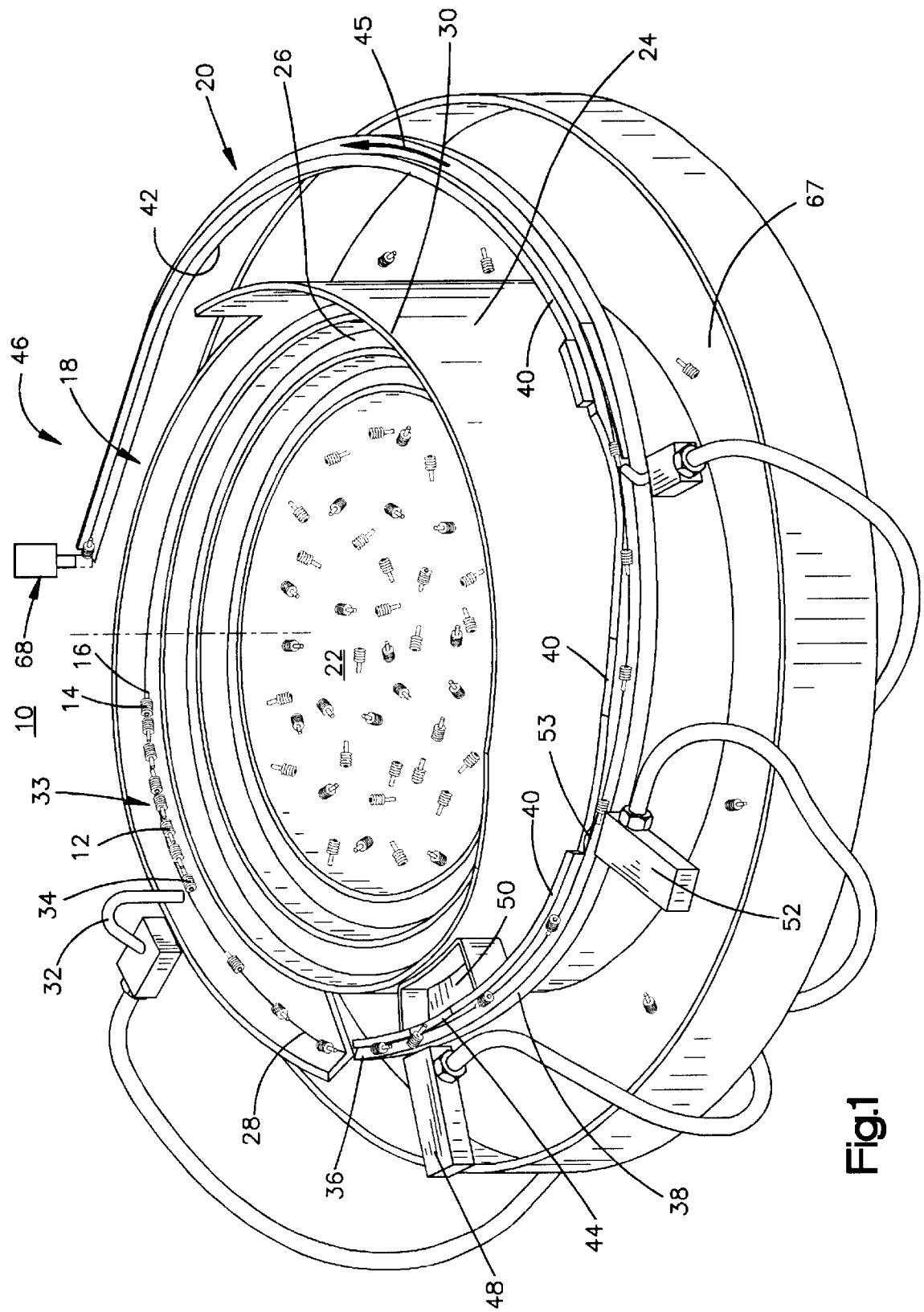
FIG. 1 is a perspective view of a vibratory bowl feeder constructed in accordance with the present invention.
Figure 2:
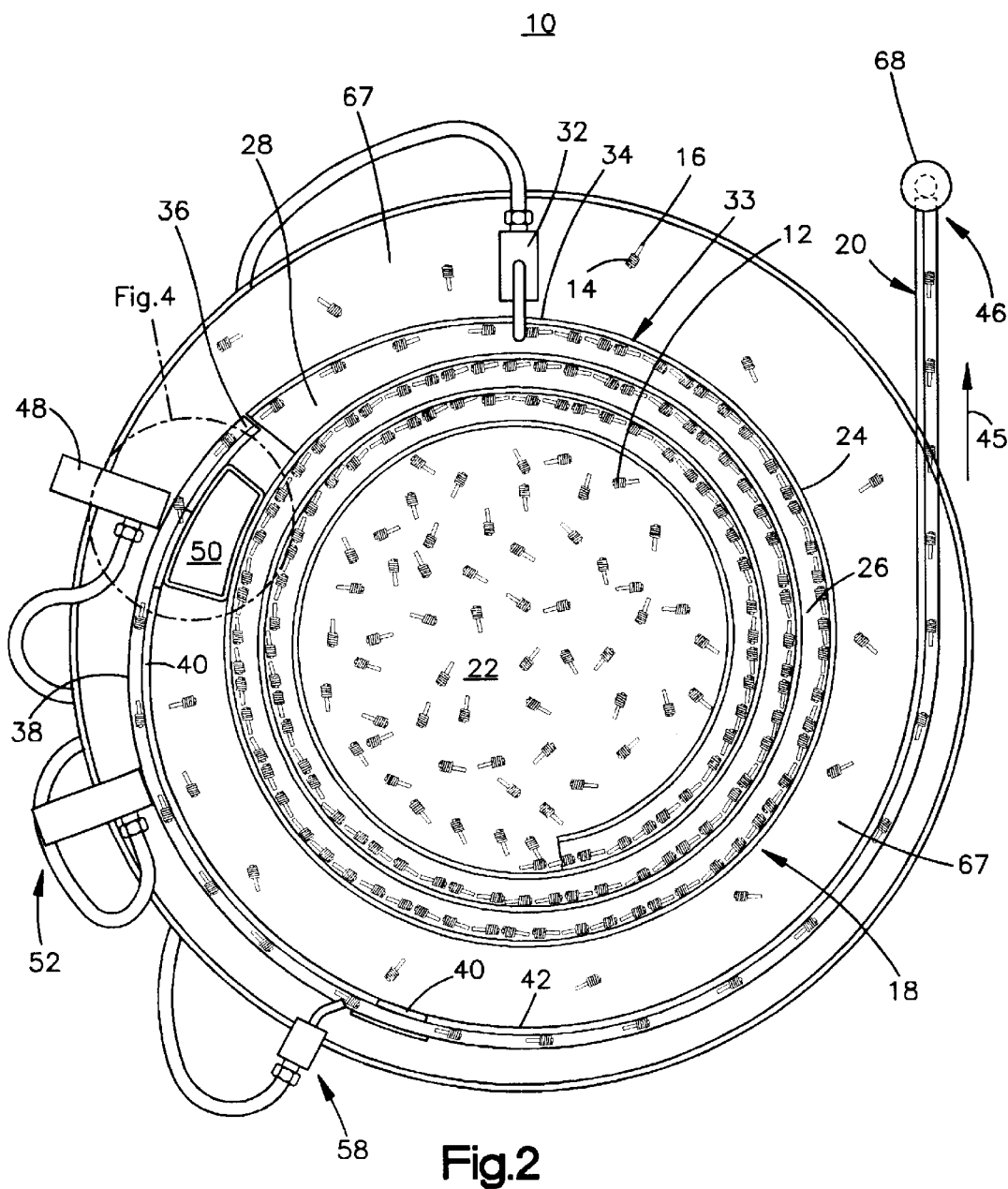
FIG. 2 is a top plan view of a vibratory bowl feeder constructed in accordance with the present invention.

Referring to FIGS. 1 and 2, the vibratory bowl 18 includes a bottom 22 that accepts a supply of electrodes 12, an outside wall 24 and an inside wall track 26 that is bounded by the outside wall 24 of the bowl. The outside wall track 26 extends from the bottom 22 of the bowl 18 to an outlet 28 at a top 30 of the bowl 18. When the vibratory bowl 18 is vibrated, electrodes 12 in the bottom 22 of the bowl 18 are carried along the track 26 to the outlet 28 of the bowl 18. As the electrodes 12 move along the outside wall track 26 of the bowl 18, the electrodes are constrained by the outside wall track 26 and the outside wall 24 of the bowl 18. In the exemplary embodiment, a standard 6" vibratory bowl fabricated by a number of bowl manufacturers is used. For example, a 6" vibratory bowl fabricated by Mid-State Automation Inc. may be used. The exemplary bowl is constructed of 11 gauge type 304 stainless steel. Mid-State Automation's model number for their 6" standard bowl is 2140. The electrodes 12 moves along the track 26 to the outlet 28 of the bowl 18 are in a random orientation with some of the electrodes 12 being oriented with the shank portion 16 leading the coil portion, while other electrodes are oriented such that the coil portion 14 leads the shank portion 16.

Referring to FIGS. 1 and 2, a separation air jet 32 is mounted to the vibratory bowl 18 near the inside wall track 26 several inches before the outlet 28 of the bowl. The separation air jet provides downward airflow normal to the vibratory track 20. The downward airflow of the separation air jet stops a leading electrode 34 from moving along the vibratory track 20 until a sufficient number of electrodes accumulate behind the stopped leading electrode 34 to force it past the separation air jet. The next electrode in the accumulation of electrodes 33 becomes the leading electrode 34 when the leading electrode moves past the separation air jet 32. In this manner, the separation jet 32 provides a continuous flow of electrodes with a desired spacing maintained between each electrode 12.

The vibratory track 20 has a first end 36 that is in communication with the outlet 28 of the vibratory bowl 18. In the region of the outlet 28, the track 26 is "L" shaped. The vibratory track 20 orients each of the electrodes 12 such that the coil portion 14 leads the shank portion 16, and transports the properly oriented electrodes to a desired location. The first end 36 of the vibratory track is approximately 0.030" below the outlet 28 of the track 26 of the bowl 18. When a leading electrode 34 escapes from the separation air jet 32, the electrodes 12 moves to the outlet 28 of the bowl track and falls from the bowl track 26 onto the vibratory track 20. The slight drop from the bowl track 26 to the vibratory track 20 causes the electrodes 12 to gain speed. The vibratory track 20 has a pitch of approximately 5° towards the center of the bowl 18. The 5° pitch of the vibratory track 20 prevents electrodes 12 from falling off an outer side 38 of the vibratory track 20. The slope of the vibratory track 20 is approximately 10° downward toward the exit in the exemplary embodiment. The vibratory track 20 also includes an inner wall 40 along an inner side 42 of the vibratory track 20. The inner wall 40 prevents electrodes 12 from falling off the inner side 42 of the vibratory track 20. Referring to FIG. 3, the variable height H of the inner wall 40 at the first end 36 of the vibratory track 20 is 0.005" in the exemplary embodiment. The inner wall height of 0.005" is constant from the first end 36 of the vibratory track 20 to a first ramp portion 44 shown in FIG. 1 and 3. At the first ramp portion 44, the height H of the inner wall 40 linearly increases from 0.005" to 0.050" over a 1½" span.

When an electrode 12 is properly oriented with the enlarged coil portion 14 leading the shank portion 16 in the direction indicated with an arrow 45, the coil makes contact with the inner wall 40 and follows the wall 40 to an exit 46 of the vibratory track 20. Referring to FIGS. 3–6, if an electrode 12 is improperly oriented with the shank portion 16 leading the coil portion 14, the shank portion 16 will make contact with the inner wall 42. The shank portion 16 is spaced from the inclined track surface 47 by an amount more than the initial wall height of 0.005", causing the shank portion 16 to tend to climb over the inner wall 40 at the first ramp portion 44 if the shank portion leads the coil portion (FIG. 3). The coil portion 14 of the electrode 12 continues to move along the track 20, because the coil is in direct contact with the vibrating track 20. Referring to FIGS. 4 and 5, the shank portion 16 slows down due to increased contact with the inner wall 40 and resultant resistance due to added friction. As the electrode 12 continues to move forward, the increased friction causes the shanks linear motion along the track to completely stop. The coil portion 14 of the electrode 12 overtakes the shank portion 16 to become even with or lead the shank portion 16 along the vibratory track 20 (FIG. 5).

Referring to FIG. 3–6, a first orientation assisting jet 48 is located on the outer side 38 of the vibratory track 20 across from the first ramp portion 44 where the inner wall 40 is approximately 0.0035" high. In the exemplary embodiment, the orientation assisting jet 48 includes three air holes that direct a flow of air across the vibratory track 20, focused on the electrode 12. The air under pressure supplied by the orientation assisting jet 48 does not affect the coil portions 14 position, because its relatively large diameter prevents the coil portion 14 from being pushed over the wall, as the wall height H at this point is approximately 0.0035". When the shank portion 16 of the electrode 12 is engaged by the air under pressure provided by the orientation assisting jet 48, the shank portion 16 is released from engagement with the ramp 44 and pivoted counterclockwise as seen in FIG. 4 and is re-oriented for continued movement along the track 20. Downstream from the jet 48 the electrode moves with the shank 16 trailing the coil 14. The electrode continues to move along the vibratory track 20 to the exit 46 of the vibratory track 20. In the exemplary embodiment, the air jet includes three jet holes (not shown) that are 0.035" in diameter. The jets require only a few pounds of pressure. The flow rate of the air supplied by the jets is adjusted to obtain desired results.

Referring to FIGS. 3–6, a blow-off tray 50 is positioned along the inner side 42 of the vibratory track 20 across from the orientation assisting jet 48. When broken electrodes, loose electrodes, incorrect electrodes, emission powder and other foreign materials travel along the vibratory track 20 past the orientation assisting jet 48, the jet 48 blows the unwanted material off of the vibratory track 20 into the blow-off tray. By removing the unwanted material from the vibratory feeder 10, the unwanted material is prevented from causing the vibratory feeder 10 to jam.

Figure 7:
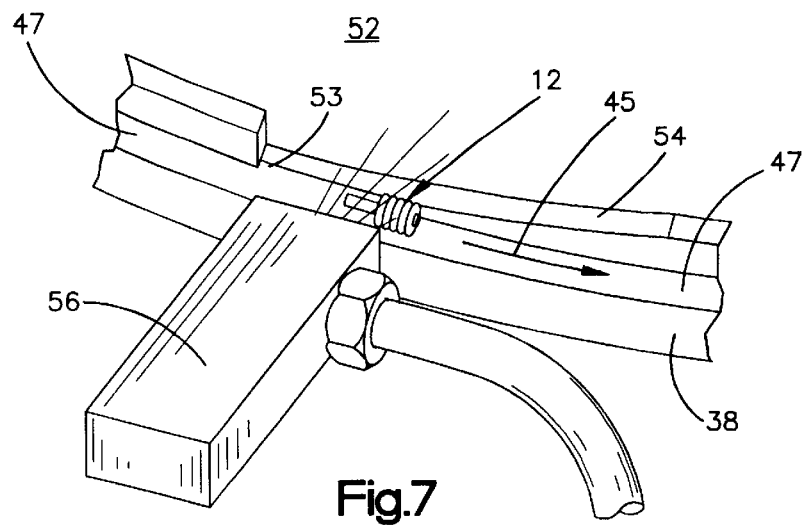
FIG. 7 is an enlarged perspective view of an electrode orienting portion of a vibratory feeder.

Although the ramp portion 44 of the vibratory feeder 10 is very effective for properly orientating electrodes 12, some electrodes may fail to be oriented in a desired direction by the first ramp portion 44. Referring to FIG. 7, a second orientation station 52 is added to the vibratory feeder 10. In the exemplary embodiment, the vibratory track 20 includes a step over region 53 of approximately 0.050". The step over region 53 is flush with the inclined track surface 47. The 0.050" step over region 53 narrows the inner wall 40 and widens the track 20 for a short distance. The effect of the 0.050" step over is to momentarily free each electrode 12 from engagement with the inner wall. A second ramp portion 54 and an orientation assisting jet 56 of the second orientation station 52 function in the same manner as the first ramp portion and orienting jet. Most electrodes 12 that were not properly oriented by the first ramp portion 44 are properly oriented by the second orientation station 52.

Figure 8:
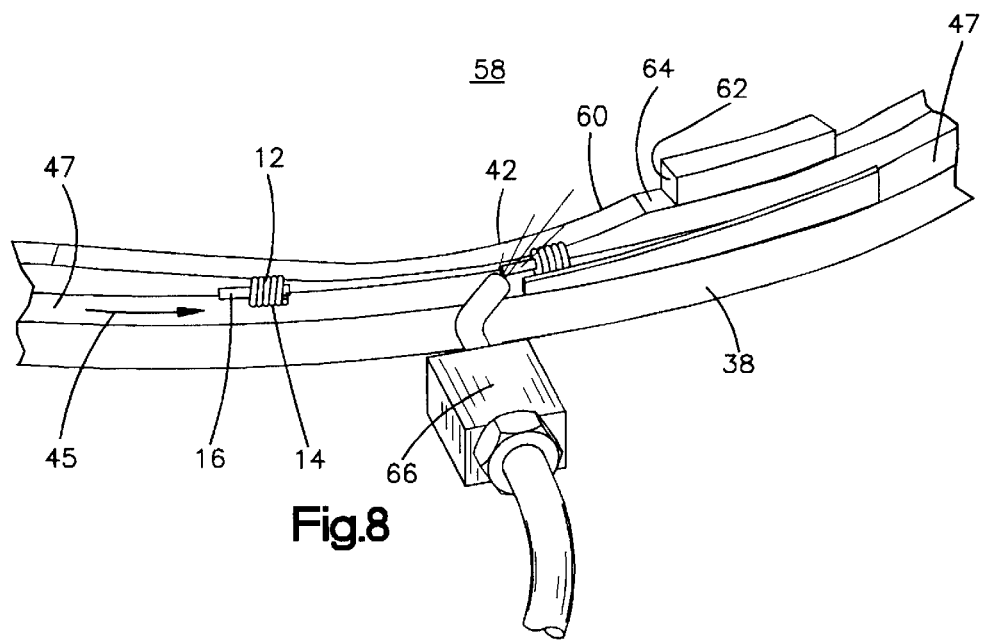
FIG. 8 is an enlarged perspective view of an electrode orienting portion of a vibratory feeder; and, FIG. 9 is an enlarged elevational view of an electrode.

In the exemplary embodiment, three orientation stations are included. FIG. 8 shows a third orientation station 58. It should be apparent to those skilled in the art that any number of orientation stations can be used to increase the reliability of the vibratory feeder 10. The orientation station 58 shown in FIG. 8 is constructed in a similar manner to the orientation stations of the two prior orientation stations. However, the ramp portion 60 of the third orientation station 58 includes a vertical wall 62 that engages any shank portions 16 that reach the top 64 of the ramp portion 60. The vertical wall 62 serves to prevent further motion of the shank portion 16 along the inner wall 40 of the vibratory track 20. The third air jet 66 is configured such that any electrodes 12 that are not properly oriented by the third orientation station 58 are blown off the inner side 42 of the vibratory track 20 back into an outer region 67 of the vibratory bowl 18 (FIGS. 1 and 2).

Referring to FIG. 2, the vibratory feeder 10 provides a supply of spaced apart electrodes 12 to the exit 46 of the vibratory track 20. One spaced apart properly oriented electrode 12 is supplied at the exit at a time. The vibratory feeder is pulse started when the demand for electrode tips 12 is sensed at the exit 46. A stop 68 is located at the exit. When an electrode reaches the stop 68 at the exit 46 of the vibratory feeder 10, the vibration of the feeder 10 stops. When demand is sensed, the stop 68 is removed from the path of the electrode, the outer track is pulsed, and the electrode 12 at the exit 46 is moved into an accumulator system (not shown) by vibration of the feeder 10. Pulse starting allows electrodes to be stored in an accumulator system, and stops electrodes from falling off track, which reduces emission coating loss that occurs when electrodes fall.

The vibratory feeder of the present invention has many advantages over previous designs. The present vibratory feeder eliminates the slotted track of prior art designs, allowing electrodes 12 that have undergone unsuccessful welding operations to be recycled. Complicated gating systems of prior art feeders have been eliminated and jams due to incomplete electrode assemblies and foreign material have been eliminated.

The number of electrodes not correctly oriented has been drastically reduced by the present invention. For example, in a test conducted at General Electric on Feb. 8, 2000, 200 electrodes were cycled through a prior art vibratory feeder and the inventive vibratory feeder of the present invention. With the prior art vibratory feeder 10, 14 of the 200 electrodes, or 7%, were incorrectly oriented, while with the vibratory feeder 10 of the present invention only 2 of the 200 electrodes 12, or 1%, were improperly oriented. In the cycle of 200 electrodes 12, the gating system of the prior art vibratory feeder became temporarily jammed 2 times while the vibratory feeder of the present invention never became temporarily jammed. The gating system of the prior art vibratory feeder became permanently jammed, requiring the equipment to be shut down to clear the jam one time out of the cycle of 200 electrodes, while the vibratory feeder of the present invention never became permanently jammed. In the cycle of 200 electrodes two electrodes became jammed in the slotted track requiring the equipment to be shut down to clear the jam, while no electrodes became jammed on the track of the vibratory feeder of the present invention. This data indicates that the design of the present invention had no temporary jams, no equipment stoppages, and a decrease of 85% of incorrect electrode orientation for a cycle of 200 electrodes.

Although the present invention has been described with a degree of particularity, it is the intent that the invention include all modifications and alterations falling within the spirit and scope of the appended claims.

I claim:

1. A method of transporting and orienting electrodes for a lamp, comprising:
   a) providing a supply of electrodes to a vibratory track;
   b) separating a leading electrode having an elongated shank portion and an enlarged coil portion from said supply of electrodes by applying fluid pressure to said leading electrode to temporarily inhibit motion along said track of said leading electrode;
   c) moving said leading electrode along said vibratory track;
   d) engaging said shank portion of a mis-oriented leading electrode with an inclined wall portion of said track to re-orient said mis-oriented electrode;
   e) continuing movement of said leading electrode along said track to transport said leading electrode.

2. The method of claim 1 further comprising applying fluid pressure to said coil portion of said mis-oriented leading electrode to assist re-orientation of said leading electrode.

3. The method of claim 1 further comprising applying fluid pressure to said track to remove debris from said track.

4. The method of claim 1 further comprising applying fluid pressure to said mis-oriented leading electrode to return said mis-oriented electrode to said supply of electrodes.

5. The method of claim 1 further comprising repeating said step of engaging.

6. The method of claim 1 further comprising engaging said shank portion with a substantially vertical wall portion to re-orient said mis-oriented leading electrode.

7. An apparatus for transporting and orienting electrodes for a lamp, comprising:
   a) a vibratory bowl having an outlet for supplying electrodes;
   b) a vibratory track having a first end in communication with said outlet of said vibratory bowl, said vibratory track including one or more gradually inclining wall portions for engaging shank portions of mis-oriented electrodes for re-orienting said misoriented electrodes;

c) an air jet mounted near said vibratory track for applying air pressure to a leading electrode to temporarily inhibit movement of said leading electrode along said track.

8. The apparatus of claim 7 further comprising an air jet mounted near said vibratory track near said wall portion for applying pressure to the mis-oriented electrodes to assist re-orienting of said mis-oriented electrodes.

9. The apparatus of claim 7 further comprising an air jet mounted near a first side of said vibratory track for applying air pressure to said vibratory track and blow-off tray mounted near a second side of said vibratory track for accepting debris.

10. The apparatus of claim 7 further comprising an air jet mounted near a first side of said vibratory track for applying air pressure to an improperly oriented electrode and an opening in said bowl near a second side of said vibratory track for accepting improperly oriented electrodes.

11. The apparatus of claim 7 further comprising a sensor near a second end of said track for sensing the presence of an electrode.

12. The apparatus of claim 7 further comprising a movable stop near a second end of said track for selectively allowing an electrode to exit said second end of said track.

13. An apparatus for transporting and orienting electrodes for a lamp, comprising:
 a) a vibratory bowl having an outlet for supplying electrodes;
 b) a vibratory track having a first end in communication with said outlet of said vibratory bowl, said vibratory track including a gradually inclining wall portion for engaging shank portions of mis-oriented electrodes for re-orienting said misoriented electrodes;
 c) an air jet mounted near said vibratory track and adjacent the inclining wall portion for applying air pressure to a leading electrode and urging the electrode toward the inclining wall.

14. The apparatus of claim 13 further comprising an additional air jet mounted near a first side of said vibratory track for applying air pressure to said vibratory track and a blow-off tray mounted near a second side of said vibratory track for accepting debris.

15. The apparatus of claim 13 wherein the air jet is mounted near a first side of said vibratory track for applying air pressure to an improperly oriented electrode and an opening in said bowl near a second side of said vibratory track for accepting improperly oriented electrodes.

16. The apparatus of claim 13 further comprising a sensor near a second end of said track for sensing the,presence of an electrode.

17. The apparatus of claim 13 further comprising a movable stop near a second end of said track for selectively allowing an electrode to exit said second end of said track.

18. The apparatus of claim 13 further comprising an additional air jet mounted near said vibratory track for applying air pressure to a leading electrode to temporarily inhibit movement of said leading electrode along said track.

19. The apparatus of claim 13 further comprising a second airjet mounted near a first side of said vibratory track for applying air pressure to said vibratory track and a blow-off tray mounted near a second side of said vibratory track for accepting debris, and a third air jet mounted near said vibratory track for applying air pressure to a leading electrode to temporarily inhibit movement of said leading electrode along said track.

* * * * *